BEST AVAILABLE COPY

G. B. SNOW.

Assignor to THE BUFFALO DENTAL MANUFACTURING CO.

Dental-Plugger.

No. 9,248. Reissued June 8, 1880.

Witnesses:

John R. Hazel

John A. Ronayne

Inventor:

George B Snow

N. PETERS, PHOTO-LITHOGRAPHER, WASHINGTON, D. C.

UNITED STATES PATENT OFFICE.

GEORGE B. SNOW, OF BUFFALO, NEW YORK, ASSIGNOR TO THE BUFFALO DENTAL MANUFACTURING COMPANY.

DENTAL PLUGGER.

SPECIFICATION forming part of Reissued Letters Patent No. 9,248, dated June 8, 1880.

Original No. 224,050, dated February 3, 1880. Application for reissue filed May 5, 1880.

*To all whom it may concern:*

Be it known that I, GEORGE B. SNOW, of the city of Buffalo, county of Erie, and State of New York, have invented certain new and useful Improvements in Dental Plugging-Instruments, which improvements are fully set forth in the following specification.

This invention relates to a new and improved device for operating the hammer of a dental plugging-instrument, consisting, essentially, of a griping-piece or friction-clutch, by the use of which it is possible to cause the hammer to fall through any distance desired at the will of the operator, and which obviates the slack or lost motion incident to the use of a spring-catch for operating the hammer as aforesaid.

It also consists in a new method of joining the two sections of the case together, whereby the case is made adjustable in length, and by means of which the travel of the tool-holder may be varied, and so, by the use of the friction-clutch hereinbefore mentioned, the force of the blows delivered upon the tool-holder may be graduated.

It also consists in an improved method of fitting the tool-holder in the case, by which lateral play between the two parts is obviated.

It also consists in a new device for compressing the spring which actuates the hammer of the instrument, affording a ready means of graduating the force of the blow delivered by it to the wishes of the operator.

Figure 1:
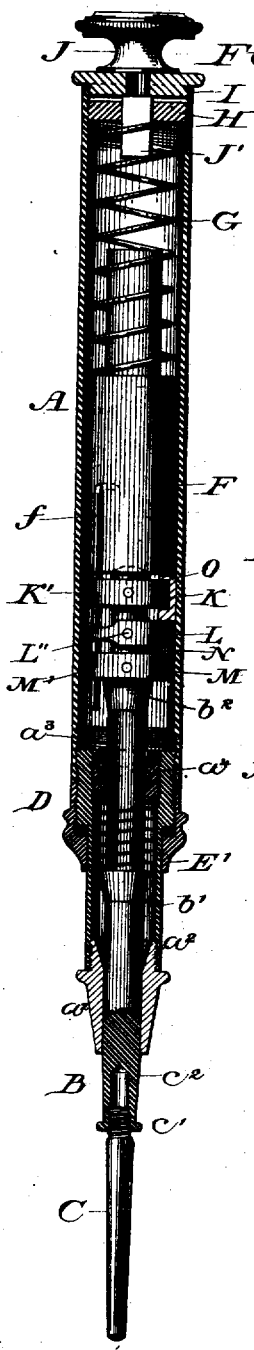
Figure 3:
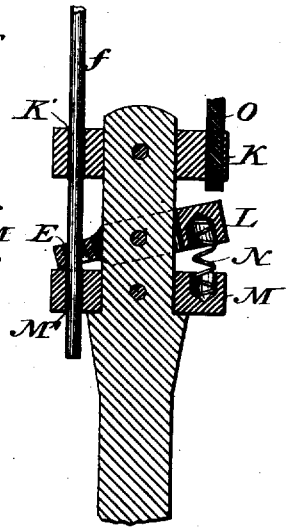
Figure 2:
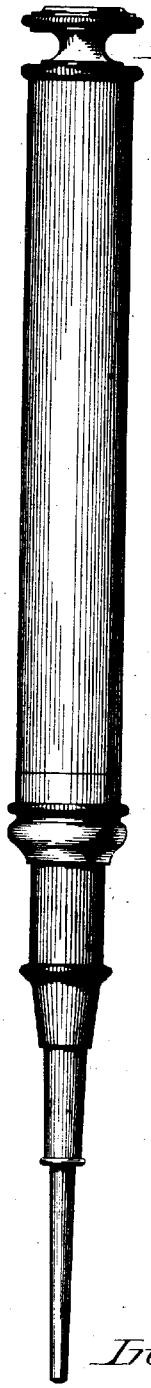

In the accompanying drawings, Figure 1 is a longitudinal section of the instrument, showing the operating parts in the position assumed at the moment when a blow is delivered by the hammer upon the end of the tool-holder. Fig. 2 is an elevation of the instrument, showing its exterior form. Fig. 3 is a section of the inner end of the tool-holder, showing the construction of the improved device hereinafter described for operating the hammer.

The friction-clutch may be used to operate the hammer of a dental plugging-instrument in a variety of ways. It may be attached to a finger-piece and operated by a motion of the finger after the instrument has been placed in the desired position; but I prefer, and shall describe, a form of instrument which is operated by pressing the instrument against a resisting object and without any external appliances, the motion being given to the working parts by a reciprocating movement of the tool-holder. To this form of instrument my device for obviating the lateral play of the tool-holder in the case is more especially applicable.

In the accompanying drawings, the case of the instrument is shown as consisting of two sections, A and A′. The section A is tubular, of a proper diameter to be easily held in the hand and manipulated, and is internally threaded for a short distance at both ends. The feather O is securely attached to its interior at such a point that it will arrest the further descent of the hammer F after it shall have come in contact with the tool-holder B. Its length is traversed by the collar K of the tool-holder, which has a rectangular notch in its side to receive the said feather O.

The inward motion of the tool-holder B is arrested by contact of the clutch L with the end of the feather O, as shown in Fig. 1, the said clutch being thereby tripped, with the effect of releasing the hammer and causing it to descend upon the tool-holder, as will be hereinafter more particularly described. The feather O therefore performs several functions, to-wit: It forms an abutment, on which the hammer rests when the instrument is not in operation. It serves as a guide to the tool-holder, preventing its rotation and allowing it only longitudinal motion. It forms an abutment for the tool-holder, arresting its inward movement, and it releases the hammer by tripping the clutch L.

The section A′ of the case is tubular, and screws into the section A, as shown at $a^3$. For the purpose of rendering the case adjustable in its length there is provided a collar, D, which operates as a jam-nut when screwed tightly against the end of the section A, which can be done whether the section A′ is screwed into the section A a greater or less distance.

The bushings $a^2$ $a^4$ are screwed into either end of the section A′, forming bearings in which the tool-holder B reciprocates. They are made of hardened steel, and their inner ends are reamed out of a conical shape, forming seats for the collars $b'$ $b^2$ on the tool-holder.

The spring E′, which encircles the middle portion of the tool-holder, has its bearing at one end on the bushing $a^4$ and at the other end on the collar $b'$. Its office is to thrust the tool-holder outward and keep the collars $b'$ $b^2$ in contact with their seats $a^2$ and $a^4$. These collars are tapered at such an angle that they will not jam in their seats nor leave them when lateral pressure is made upon the tool-holder. They are shown with a straight taper; but one of a hollow outline may be used, if preferred.

It is obvious that the tool-holder will have no lateral play when the collars are seated in their bearings, while it is free to move longitudinally when pressure is made upon it.

The tool-holder B has at its outer end a socket for the reception of the plugging-tool C. The inner end of the tool-holder projects into the case A, and has securely fastened upon it two collars, K and M. Between these collars is a griping piece or clutch, L, which is of an annular shape, encircling the tool-holder, and which oscillates upon the pin L″ as a center, the said pin passing through the tool-holder B.

The rod $f$ passes through holes in the three pieces K, L, and M, as shown at K′, E, and M′. In the collar K a rectangular notch is formed opposite to the hole K′, which receives and passes over the feather O, the office of which has been heretofore described.

There is interposed between the clutch L and the collar M a spiral spring, N, which is held in suitable depressions in the surfaces of the respective pieces, formed at points opposite to the holes E and M.

The office of the spring N is to tilt the clutch L into the position shown in Fig. 3, where it is shown as griping the sides of the rod $f$, which it holds firmly against a downward pressure, while it will allow it to slip freely in the opposite direction.

It is obvious that an upward movement of the tool-holder B will be immediately communicated to the rod $f$ through the clutch L without there being any lost motion between the parts, and that the clutch L will hold the rod $f$ at any point in its length with which it may happen to be in contact.

The hammer F reciprocates in the case A. It is impelled by the spring G, and rests, when the instrument is not in operation, upon the end of the feather O. The rod $f$ is received in a groove formed in one side of the hammer, and is connected thereto by one end, which is bent at a right angle, and is received into a hole drilled into the side of the hammer at the bottom of the groove.

The upper end of the case A is closed by the screw-cap I. Through the center of the cap, and rotating therein, passes a shaft, J′, which is of a square section in all that portion of its length which projects into the case A beyond the screw-cap I. The milled head J is fastened to the outer end of the shaft J′, and surmounts the screw-cap I. The square part of the shaft J′ passes through a square hole in a diaphragm, H, which traverses the shaft J′ longitudinally and rotates with it. The periphery of the said diaphragm is threaded, and engages with the internal thread in the upper end of the case A. It will be seen that the diaphragm H may be rotated by the rotation of the milled head J, and the tension of the spring G increased or diminished at pleasure, thus graduating the impulse given to the hammer F.

The inward movement of the tool-holder B is limited by the contact of the clutch L with the feather O, as shown in Fig. 1. Its outward movement is arrested by the contact of the collars $b'$ $b^2$ with their seats in the bushings $a^2$ $a^4$. As these bushings may be made to approach or recede from the feather O by adjusting the sections A and A′, as heretofore described, it will be seen that the travel of the tool-holder may be thus varied, and as the clutch L will engage with the rod $f$ at any point, it follows that the fall of the hammer and the force of its blow may be varied by the adjustment of the section A′ in the section A by means of the collar D.

Upon the point of the tool C being pressed against the filling in the tooth the case A A′ slides over the tool-holder. The clutch L holds the rod $f$, and thus retains the hammer F at the same distance from the tool-holder B which existed before the instrument was put in operation. The feather O, forming part of the case A A′, descends with it until it strikes and tilts the clutch L, causing it to loosen its hold upon the rod $f$, which releases the hammer F, which descends upon the tool-holder with a degree of force dependent upon the distance through which it falls and the tension of its actuating-spring G. As the pressure upon the instrument is relaxed the recoil of the spring E′ throws back the case into its original position. The hammer F is carried back with it as it rests upon the feather O, and it is thus separated or raised from the tool-holder, and the rod $f$ slips through the clutch L. If the pressure of the instrument upon the filling should again be made, even though its entire return-stroke were not completed, the clutch L would engage with the rod $f$ and operate the hammer. In fact, the hammer may be operated by any amount of motion of the tool-holder, from that just sufficient to tilt the clutch L up to the full amount for which the instrument may be designed.

Having thus fully described my improved dental plugging-instrument, I claim as my invention and desire to secure by Letters Patent—

1. The combination, in a dental plugging-instrument, of a reciprocating hammer and a friction-clutch and a bar connecting the said hammer and clutch, substantially as described.

2. The combination of the collars K and M, the clutch L, and the rod *f*, substantially as described.

3. The combination of the hammer F, the collar K, the clutch L, and the feather O, substantially as described.

4. The combination of a reciprocating tool-holder, a tubular case, and one or more taper collars and corresponding taper bushings for the same, substantially as described.

5. The combination of the sections A and A′ of the case, united by a screw-thread, with the collar D, adjusting by screw-threads upon the section A′ and abutting against the end of the section A, for the purpose of adjusting the length, substantially as described.

6. The combination of the diaphragm H, threaded upon its periphery and engaging thereby with the internal thread in the case A, with the shaft J, upon which it has longitudinal motion, the screw-cap I, and the knob J, substantially as described.

GEORGE B. SNOW.

Witnesses:
JAMES V. LEWIS,
WILLIAM GRAM, Jr.